United States Patent
Sladowski

[11] Patent Number: 5,887,542
[45] Date of Patent: Mar. 30, 1999

[54] TREAT STICK HOLDER

[76] Inventor: Alex Sladowski, 4305 Gravenstein Highway South, Sebastopol, Calif. 95472

[21] Appl. No.: 956,275

[22] Filed: Oct. 22, 1997

Related U.S. Application Data

[60] Provisional application No. 60/029,594 Oct. 23, 1996.
[51] Int. Cl.[6] .................................................. A01K 39/01
[52] U.S. Cl. ......................................... 119/51.03; 119/710
[58] Field of Search .................................. 119/51.03, 464, 119/477, 475, 709, 710, 711

[56] References Cited

U.S. PATENT DOCUMENTS

| | | | |
|---|---|---|---|
| D. 92,107 | 4/1934 | Proctor | 119/51.03 |
| 281,993 | 7/1883 | Goldstein | 119/51.03 |
| 321,582 | 7/1885 | Cox | 119/51.03 |
| 1,369,079 | 2/1921 | Boothe | 119/51.03 |
| 1,550,438 | 8/1925 | Hohmann | 119/51.03 |
| 1,596,333 | 8/1926 | Boyle | 119/51.03 |
| 2,718,873 | 9/1955 | Buckner | 119/709 |
| 3,482,549 | 12/1969 | Episcopo | 119/51.03 |
| 5,277,147 | 1/1994 | Dupuis et al. | 119/51.03 |

*Primary Examiner*—Michael J. Carone
*Assistant Examiner*—Yvonne R. Abbolt
*Attorney, Agent, or Firm*—George C. Limbach; Limbach & Limbach LLP

[57] ABSTRACT

A treat stick holder is disclosed having an elongate support arm and a helical coil member with its ends connected to the support arm at longitudinally spaced positions. The coil member is positioned below the support member and with the axis of the helical coil positioned at an angle to the axis of the support arm.

10 Claims, 1 Drawing Sheet

TREAT STICK HOLDER

This application claims priority from U.S. Provisional Application No. 60/029,594, filed Oct. 23, 1996, now abandoned, entitled "MILLET SPRAY HOLDER."

The present invention is directed to a treat stick holder for birds or small animals such as a millet spray holder primarily for attachment to a bird cage for the caged bird to perch upon the millet spray holder and eat the seeds of a millet spray held thereby. A treat stick would be supported in a larger holder for large birds and small animals.

SUMMARY OF THE INVENTION

In accordance with the present invention a treat stick or millet spray holder is provided with a support arm for a helical coil in which the stick or spray can be positioned and with the holder including means for clamping to a bird cage.

In the preferred embodiment the ends of the helical coil are connected to the support arm at longitudinally spaced positions and adapted to cradle an elongate member, such as a stick or spray, within the coil of the member and wherein the coil member is positioned below the support member with the axis of the helical coil being positioned at an angle to the longitudinal axis of the support member.

DESCRIPTION OF THE PREFERRED EMBODIMENT

Figure 1:
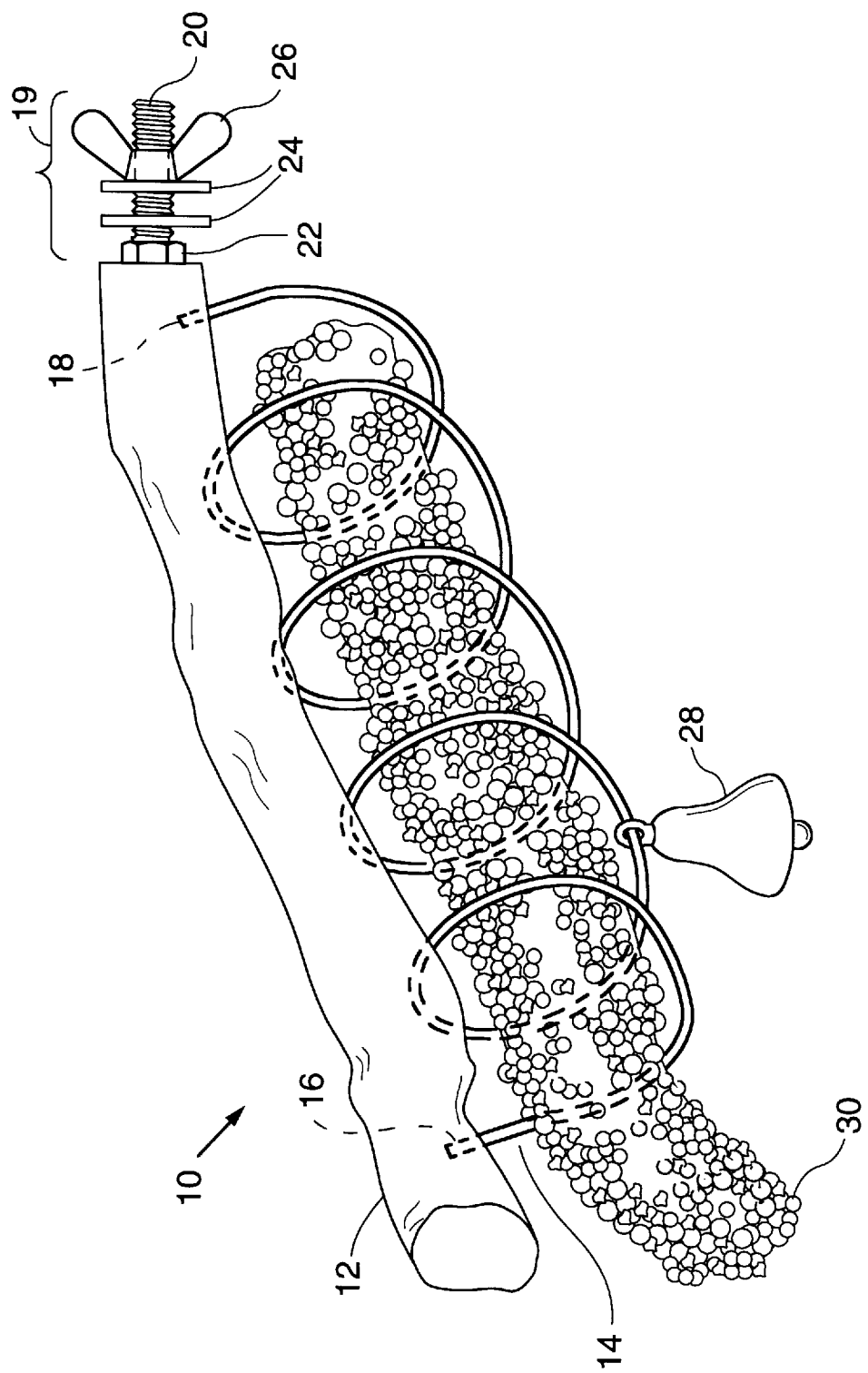
FIG. 1 is a prospective view of the treat stick holder of the present invention.

Referring now to FIG. 1, there is shown a millet spray holder 10 in accordance with the present invention including a support arm or rod 12, preferably a section of an arbutus branch, with a support coil 14 attached thereto. The support coil 14, preferably made of rigid self-supporting wire has its two free ends 16 and 18 extending radially from the coil and fixedly embedded in the support arm 12 with the axis of the coil 14 preferably not aligned with the axis of the support arm 12 so that a millet spray 30 supported within the support coil 14 will project out on opposite sides of the support arm 12.

The spray holder includes a clamping device 19 to clamp the spray holder 10 onto a bird cage. In the preferred embodiment, the clamping device includes a machine screw 20 embedded in the end of the support arm 12 and fixed thereto with a nut 22. A pair of washers 24 are provided on the screw 20 between the nut 22 and a wing nut 26 which can be tightened to clamp a wire portion of the bird cage between the washers 24.

In the preferred embodiment, a metal bell 28 is slidably mounted on the support coil 14.

In use one or more pieces of millet are telescopically positioned within the support coil 14 so that a bird can sit on the support arm 12 or the coil 14 and feed on the millet. When a bird pecks hard enough on the millet, the millet spray holder can vibrate sufficiently for the bell to ring.

In a preferred embodiment of the invention, the millet spray holder is on the order of 6 to 10 inches long and the support coil is 1½ to 2 inches in diameter.

I claim:

1. A treat stick holder comprising:
   an elongate support arm having a longitudinal axis,
   a coil member having the ends thereof directly connected to said support arm at longitudinally spaced positions on said support arm and adapted to cradle a treat stick within the coil of said coil member, and
   means for mounting said support arm from an elevated position.

2. The treat stick holder of claim 1 wherein said coil member is a substantially helical coil.

3. The treat stick holder of claim 2 wherein the axis of said helical coil is positioned at an angle to the axis of said support member.

4. The treat stick holder of claim 1 wherein said mounting means is connected to one end of said support arm.

5. The treat stick holder of claim 4 wherein said mounting means includes a screw connected to said support arm and a pair of spaced apart washers on said screw and a nut on said screw for clamping said washers together against an object in elevated position.

6. A treat stick holder comprising:
   an elongate support arm having a longitudinal axis,
   a coil member having the ends thereof connected to said support arm and longitudinally spaced positions on said support arm and adapted to cradle a treat stick within the coil of said coil member,
   means for mounting said support arm from an elevated position, and
   said helical coil being positioned below said support arm when said support member is supported in an elevated position.

7. A treat stick holder comprising:
   an elongate support arm having a longitudinal axis,
   a substantially helical coil member having the ends thereof connected to said support arm at longitudinally spaced positions on said support arm and adapted to cradle a treat stick within the coil of said coil member,
   a bell slidably supported on said helical coil member, and
   means for mounting said support arm from an elevated position.

8. A treat stick holder comprising:
   an elongate support arm having a longitudinal axis,
   a substantially helical coil member having the ends thereof directly connected to said support arm at longitudinally spaced positions on said support arm and adapted to cradle a treat stick within the coil of said coil member, said coil member positioned below said support member with the axis of said helical coil being positioned at an angle to the axis of said support arm, and
   means for mounting at least one end of said support arm from an elevated position.

9. The treat stick holder of claim 8 wherein said mounting means includes a screw connected to said support arm and a pair of spaced apart washers on said screw and a nut on said screw for clamping said washers together against an object in elevated position.

10. A treat stick holder comprising:
    an elongate support arm having a longitudinal axis,
    a substantially helical coil member having the ends thereof directly connected to said support arm at longitudinally spaced positions on said support arm and adapted to cradle a treat stick within the coil of said coil member, said coil member positioned below said support member with the axis of said helical coil being positioned at an angle to the axis of said support arm,
    a bell slidably supported on said helical coil member, and
    means for mounting at least one end of said support arm from an elevated position.

* * * * *